Figure 1:
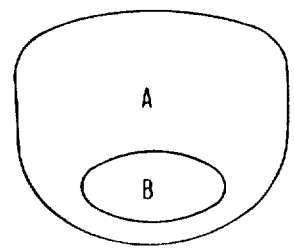

United States Patent

[11] 3,610,924

[72] Inventor Philippe Sinai
 112, quai Louis Bleriot, 75 Paris 16eme, France
[21] Appl. No. 1,864
[22] Filed Jan. 9, 1970
[45] Patented Oct. 5, 1971
[32] Priority Jan. 15, 1969
[33] France
[31] 6,900,594

[54] METHOD OF MAKING BIFOCAL LENSES COMPRISING TREATING A PRESELECTED AREA OF A SINGLE FOCAL LENGTH LENS WITH IONIZING RADIATION
22 Claims, 2 Drawing Figs.

[52] U.S. Cl. .................................................. 250/49.5 TE,
 250/49.5 T, 350/175 GN, 350/178, 350/194, 351/169
[51] Int. Cl. ........................................................ G02b 3/10, G02c 7/06
[50] Field of Search .......................................... 250/49.5 TE, 49.5 GC, 49.5 R, 106 R, 49.5 TC; 65/30

[56] References Cited
UNITED STATES PATENTS
3,486,808 12/1969 Hamblen ..................... 351/177

OTHER REFERENCES

" Optical Waveguides Formed by Proton Irradiation of Fused Silica," Schineller, Journal of The Optical Society of America, Vol. 58, No. 9 Sept. 1968, pp. 1171- 1176.

Primary Examiner—James W. Lawrence
Assistant Examiner—C. E. Church
Attorney—Craig, Antonelli & Hill ABSTRACT: A method for obtaining corrective glass lenses which are provided with at least two zones having different powers so that one zone serves to view nearby objects and the other zone serves to view distant objects wherein, in order to carry out a modification of power in a predetermined region of a corrective lens without entailing any alteration in the shape of said lens, said region is exposed to a radiation flux which results in a modification of its refractive index.

PATENTED OCT 5 1971

3,610,924

INVENTOR

PHILIPPE SINAI

BY Craig, Antonelli & Hill
ATTORNEYS

METHOD OF MAKING BIFOCAL LENSES COMPRISING TREATING A PRESELECTED AREA OF A SINGLE FOCAL LENGTH LENS WITH IONIZING RADIATION

The present invention relates to a method for obtaining corrective glass lenses which are provided with at least two zones having different powers, such lenses being adapted both to viewing of nearby objects as well as objects located at optical infinity. The invention is also concerned with the lenses obtained in accordance with said method. Glass lenses of this type which are well known in spectacle lens optics exist at the present time either in the form of "bifocal lenses" or in the form of "progressive curvature lenses," otherwise known simply as "progressive lenses."

In the majority of cases, a bifocal lens is intended for viewing objects located at optical infinity, a second lens having smaller dimensions and formed of a material having a different refractive index so as to permit viewing of nearby objects being added to the first lens in a zone which is located off-center. This zone can also be formed by grinding. A bifocal lens thus has two perfectly defined zones having separate and distinct magnifying powers which are markedly different from each other. In consequence, wearers of spectacles which are fitted with lenses of this type not infrequently experience difficulty in becoming accustomed to them and only then after a long time.

A progressive lens also has a zone for viewing distant objects and a zone for viewing nearby objects but these two zones which have different powers or so-called stabilized vision zones are separated in this case by a third zone whose power progresses continuously from the near vision zone to the far vision zone. Thus, the eye can shift imperceptibly and therefore without fatigue from distant vision accommodation to near vision accommodation and conversely. This continuous power variation is obtained at the present time by means of a continuous variation in the radius of curvature of the glass. These lenses are fabricated either by molding or by grinding.

It can readily be understood that the manufacture of bifocal lenses and of progressive lenses is particularly difficult and entails high capital cost.

The precise aim of this invention is to propose a method for obtaining lenses of the type referred to above which makes profitable use of the variations in refractive index produced in an optical medium by corpuscular and electromagnetic radiations.

More precisely, the present invention is directed to a method of obtaining corrective glass lenses which are provided with at least two zones having different powers so that one zone serves to view nearby objects while the other zone serves to view distant objects, said method being mainly characterized in that, in order to carry out a modification of power in a predetermined region of a corrective lens without thereby entailing any alteration in the shape of said lens, said region is exposed to a radiation flux which results in a modification of its refractive index.

Further properties of this invention will be brought out by the following description and reference to the accompanying drawing which gives by way of explanation but not in any limiting sense a number of different modes of operation which may be adopted in order to produce a bifocal glass lens and a progressive lens by means of exposure to radiation.

Figure 2:
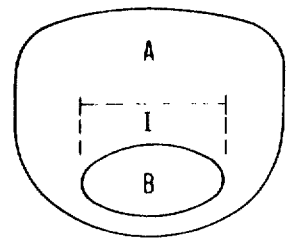

The illustration of the invention can be made with the aid of the two attached figures, wherein:

FIG. 1 shows a glass with double the normal focus, which comprises a zone A for viewing distant objects and a zone B for viewing objects close up, and FIG. 2 illustrates a progressive glass which comprises a zone A for viewing distant objects, a zone B for viewing closeup objects and an intermediate zone I assuring the transition between these two zones.

A bifocal corrective lens can be obtained in accordance with the invention in a number of different ways. The starting element can be a bifocal lens which is fabricated by the mechanical means at present employed and the power of either of its two zones can be modified by subjecting the lens to a radiation flux of constant intensity.

In FIG. 1, a double glass already having zones A and B obtained by cutting is shown one or even both of these zones is irradiated so as to modify the indices of refraction thereof. An alternative method would be to provide a glass having only one refractive power region and induce the second zone B by irradiation. The effect of this irradiation is to modify the refractive index of the zone concerned and therefore the power of that zone.

Starting from a single configuration of lens which has initially two well-defined power zones, it is thus possible to obtain a whole series of lenses having different characteristics. The number of types of lenses to be produced by mechanical means is therefore considerably reduced and this represents a substantial advantage from the economic standpoint when the cost of manufacture of glass lenses of this type is taken into consideration.

Another mode of operation in accordance with the invention consists in employing in this instance a normal lens, that is to say a lens having a single optical center for viewing distant objects and in producing by irradiation the zone which is intended for viewing close objects.

To carry out this method one employs a glass with double the normal focus (as shown in FIG. 1) and produces therein, by irradiation, an intermediate zone I (as shown in FIG. 2); the zones A and B may, of course, also be irradiated. Further, one may provide a progressive glass lens already cut, and irradiate one of the zones A and B, at the same time as irradiating the zone I, so as to adapt it to the new indices of A and B, or start with a normal glass lens with a single focus and produce therein the zones B and I by irradiation.

Thus, there are a number of methods for fabricating a progressive lens in accordance with the invention. One method consists in employing a glass element in which the two zones for viewing nearby objects and for viewing distant objects have been produced in any desired manner. In this case, the glass element is exposed in the intermediate zone to a radiation flux having a continuously varying intensity in order to produce a continuous variation of the refractive index in said element, thereby creating a zone having a power which progresses also in a continuous manner when moving away from the near vision zone towards the distant vision zone.

It will be apparent that modifications in the power of the two stabilized vision zones can be carried out conjointly by irradiation with a flux of constant intensity which makes it possible as in the case of bifocal lenses to reduce the number of types of glass to be fabricated by mechanical means.

It is also possible to employ a stating element a progressive glass lens which is produced by the usual methods and then to modify by irradiation the power of either of the two stabilized vision zones at the same time as the power of the progressive power zone in order to adapt this power to the new characteristics of the glass lens.

Finally, it is possible as in the case of bifocal lenses to employ as starting element a normal lens which has a single optical center and to form by irradiation both the near vision zone and the intermediate progressive power zone.

The glasses which have been treated can be either mineral glasses or organic glasses. In the case of mineral glasses, irradiation is carried out by means of a neutron flux whereas in the case of organic glasses, recourse is had to gamma radiation or electrons.

One type of mineral glass which is particularly well suited to the above-mentioned neutron irradiation treatment is a silica-base glass containing a low percentage (3 percent) of boron–10 in the form of boric anhydride ($B_2O_3$) or lithium–6 in the form of lithium oxide ($LiO_2$). It will naturally be understood that any material can be employed on condition that it does not contain any impurities which would be liable to exhibit any residual radioactivity after exposure to neutron radiation as this would incompatible with the high-radiation sensitivity of the human eye.

Variation in radiation flux intensity is obtained by means of a screen formed of a radiation-absorbing material, the thickness of which varies in such a manner as to obtain the desired law. When the irradiation is carried out with electrons, the law of variation of the flux can be obtained by means of deflection under the action of an electric or magnetic field.

In the majority of cases, the irradiated glasses are subjected to a thermal decolorizing treatment at a temperature which is lower than that of index recovery. This heat treatment can be accompanied by irradiation with ultraviolet rays which has the effect of accelerating the removal of coloring. In some cases, the glasses are subjected to a complementary polishing treatment for the purpose of correcting any variations in volume which may have taken place during irradiation.

Finally, at the time of irradiation of glasses, additional index modifications can certainly be made in order to correct these aberrations and their effects on the eye. The method employed is of the type described in French Pat. No. PV 175 043 filed on Nov. 22, 1968 in the name of the present applicant.

It must be understood that this invention is not limited solely to the examples hereinabove described and that the scope of this patent also extends to alternative forms of either all or part of the arrangements herein described which remain within the scope of equivalent means as well as to any application of such arrangements.

What I claim is:

1. A method for obtaining corrective glass lenses which are provided with at least two zones having different powers so that one zone serves to view nearby objects and the other zone serves to view distant objects, in order to carry out a modification of power in a predetermined region of a corrective lens without entailing any alteration in the shape of said lens, comprising the step of modifying the refractive index of said region by exposing said region to a radiation flux.

2. A method in accordance with claim 1 for obtaining bifocal lenses provided with only two zones having different powers, wherein said method further comprises the step of irradiating at least one of said zones with a radiation flux of constant intensity in space.

3. A method in accordance with claim 1 for obtaining progressive lenses or lenses in which said region lies between the zones having different powers and comprises a transition zone which exhibits the continuously variable power, wherein said step of exposing said region to radiation flux comprises the step of irradiating said transition zone with a radiation flux whose intensity varies continuously in space.

4. A method in accordance with claim 1 for obtaining progressive lenses in which said region lies between the zones having different powers and comprises a transition zone which exhibits a continuously variable power, wherein said method comprises the steps of irradiating said transition zone with a radiation flux whose intensity varies continuously in space and irradiating at least one of the two other zones with a radiation flux whose intensity is constant in space.

5. A method in accordance with claim 1, wherein said corrective glass is mineral glass and wherein said irradiation steps comprise bombarding said mineral glass with neutrons.

6. A method in accordance with claim 1, wherein said glass is organic glass and said step of exposing said region to radiation flux comprises bombarding said glass with gamma rays.

7. A method in accordance with claim 1, further including the step of subjecting said glass to a thermal decolorizing treatment.

8. A method in accordance with claim 1, further including the step of subjecting said glass to a polishing treatment after irradiation in order to correct variations in volume which result from said irradiation.

9. A method in accordance with claim 1 wherein said glass is organic glass and said step of exposing said region to radiation flux comprises bombarding said glass with electrons.

10. A method in accordance with claim 2, further including the step of subjecting said glass to a thermal decolorization treatment.

11. A method in accordance with claim 3, further including the step of subjecting said glass to a thermal decolorization treatment.

12. A method according to claim 4, further including the step of subjecting said glass to a thermal decolorization treatment.

13. A method according to claim 2, further including the step of subjecting said glass to a polishing treatment after irradiation in order to correct variations in volume which result from said irradiation.

14. A method according to claim 3, further including the step of subjecting said glass to a polishing treatment after irradiation in order to correct variations in volume which result from said irradiation.

15. A method in accordance with claim 4, further including the step of subjecting said glass to a polishing treatment after irradiation in order to correct variations in volume which result from said irradiation.

16. A method of obtaining a corrective glass lens comprising the steps of:
   providing a glass lens having two zones of different powers, one zone serving for viewing nearby objects, while the other zone serves for viewing distant objects; and
   modifying the refractive index of a predetermined region of said lens by exposing said lens to a radiation flux,
   whereby the power of said predetermined region will be altered without changing the shape of said lens.

17. A method according to claim 16, wherein said step of providing a glass lens having two zones of different powers comprises the step of irradiating a first zone of a glass lens with flux of constant intensity.

18. A method according to claim 17, wherein said step of modifying the refractive index of a predetermined region of said lens includes the step of exposing said region to a flux of radiation, the intensity of which varies in space.

19. A method according to claim 18, wherein said step of providing said glass lens comprises providing a silica-base glass having a substantially small percentage of boron–10.

20. A method according to claim 18, wherein said step of providing said glass lens comprises providing a silica-base glass having a substantially small percentage of lithium–6.

21. A method according to claim 19, wherein said silica-base glass contains boric anhydride.

22. A method according to claim 20, wherein said silica-base glass contains lithium oxide.